United States Patent
Yoshida et al.

(10) Patent No.: US 9,082,572 B2
(45) Date of Patent: Jul. 14, 2015

(54) TANK TYPE VACUUM CIRCUIT BREAKER

(75) Inventors: Satoru Yoshida, Tokyo (JP); Yuta Nakayama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/118,574

(22) PCT Filed: Nov. 8, 2011

(86) PCT No.: PCT/JP2011/075682
§ 371 (c)(1),
(2), (4) Date: Nov. 19, 2013

(87) PCT Pub. No.: WO2012/172703
PCT Pub. Date: Dec. 20, 2012

(65) Prior Publication Data
US 2014/0124480 A1 May 8, 2014

(30) Foreign Application Priority Data

Jun. 17, 2011 (JP) .................................. 2011-134955

(51) Int. Cl.
*H01H 33/66* (2006.01)
*H01H 33/666* (2006.01)
(Continued)

(52) U.S. Cl.
CPC ............ *H01H 33/6606* (2013.01); *H01H 33/66* (2013.01); *H01H 33/666* (2013.01); *H01H 33/66261* (2013.01); *H02B 13/0354* (2013.01)

(58) Field of Classification Search
CPC .................................................... H01H 33/66
USPC ........... 218/118, 120, 122, 127, 134, 135, 68, 218/140; 200/144; 361/605, 611
See application file for complete search history.

(56) References Cited

U.S. PATENT DOCUMENTS 3,167,629 A * 1/1965 Cobine .................... 218/136
3,983,345 A * 9/1976 Phillips .................... 218/122
(Continued)

FOREIGN PATENT DOCUMENTS

CN 1377109 A 10/2002
JP 2007-306701 A 11/2007
(Continued)

OTHER PUBLICATIONS

International Search Report (PCT/ISA/210) mailed on Dec. 6, 2011, by the Japanese Patent Office as the International Searching Authority for International Application No. PCT/JP2011/075682.
(Continued)

*Primary Examiner* — Renee Luebke
*Assistant Examiner* — Bunyamin Tufan
(74) *Attorney, Agent, or Firm* — Buchanan Ingersoll & Rooney PC

(57) ABSTRACT

In a tank type vacuum circuit breaker in which each of movable side and fixed side connection terminals of a vacuum interrupter arranged in a main tank and the lower end of each of conductors of a pair of bushings arranged in a standing condition in the main tank are connected by a flexible conductor and a shield for surrounding connection portions is provided, the shield is configured by combining: a main body side shield which is provided on axial both sides of the vacuum interrupter and covers a connection portion of the flexible conductor and the connection terminal; and a bushing side shield which is provided on the lower end side of the conductor and covers a connection portion of the conductor and the flexible conductor.

16 Claims, 3 Drawing Sheets

(51) Int. Cl.
*H01H 33/662* (2006.01)
*H02B 13/035* (2006.01)

(56) References Cited

U.S. PATENT DOCUMENTS

| | | | |
|---|---|---|---|
| 6,153,846 A * | 11/2000 | Morita et al. | 218/122 |
| 6,545,241 B1 * | 4/2003 | Franchi et al. | 218/78 |
| 7,098,418 B1 * | 8/2006 | Yamada et al. | 218/120 |
| 2001/0004067 A1 * | 6/2001 | Kikukawa et al. | 218/122 |
| 2001/0040146 A1 * | 11/2001 | Miyo et al. | 218/118 |
| 2002/0043515 A1 * | 4/2002 | Kajiwara et al. | 218/118 |
| 2002/0043516 A1 * | 4/2002 | Morita et al. | 218/118 |
| 2002/0134757 A1 | 9/2002 | Nishizumi et al. | |
| 2010/0288733 A1 | 11/2010 | Ichikawa et al. | |

FOREIGN PATENT DOCUMENTS

| | | |
|---|---|---|
| JP | 2010-178526 A | 8/2010 |
| JP | 2011-97686 A | 5/2011 |

OTHER PUBLICATIONS

First Office Action dated Mar. 30, 2015 issued in the corresponding Chinese Patent Application No. 201180071672.6 and English translation (9 pages).

* cited by examiner

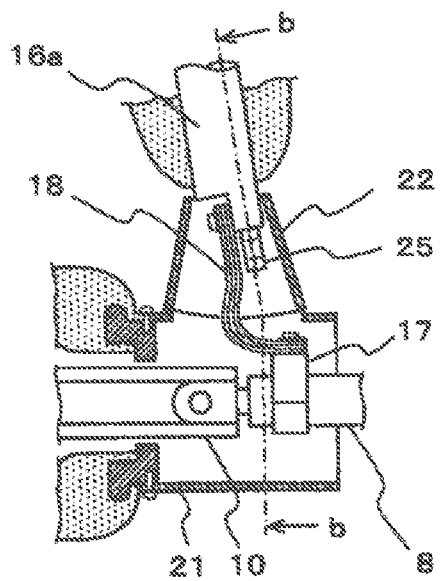
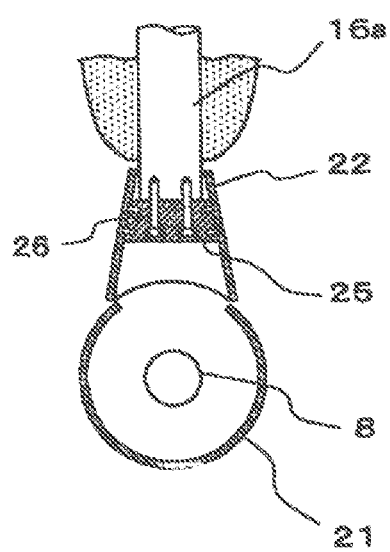
(a) (b)
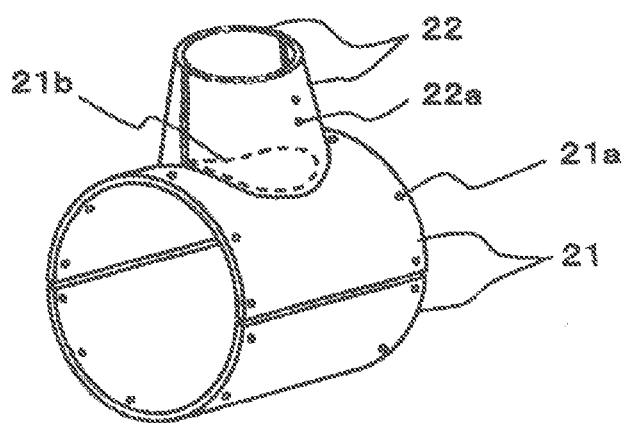

TANK TYPE VACUUM CIRCUIT BREAKER

TECHNICAL FIELD

The present invention relates to a tank type vacuum circuit breaker and, more particularly, relates to the structure of connection portions in which each of bushings is connected to each of movable side and fixed side terminals in the inside of a tank.

BACKGROUND ART

In a tank type vacuum circuit breaker, a circuit breaker main body portion composed of a vacuum interrupter and the like is supported by an insulation member to be horizontally arranged in a ground tank which is horizontally arranged and is filled with insulating gas, and a pair of bushings are arranged in a standing condition on the upper side of the ground tank. A connection terminal of a movable side conductor led out from a movable side contact the vacuum interrupter is connected to the lower end of a conductor of one bushing; and a connection terminal of a fixed side conductor led out from a fixed side contact is connected to the lower end of a conductor of other bushing.

The connection structure of a conductor and a conductor portion of the circuit breaker side in a conventional tank type vacuum circuit breaker is disclosed that, for example, the circuit breaker includes a movable side contact case and a fixed side contact case, in which the lower end side of the conductor of each of bushings is capable of inserting into each of the movable side and the fixed side of a vacuum interrupter, and the bushing conductor formed in a pipe shape is directly fitted into a fitting hole of each of the contact cases and connected (for example, see Patent Document 1).

Furthermore, a technique is also disclosed that a fixed side conductor led out from a fixed side contact of a vacuum interrupter is connected to a conductor of one bushing by fixed side connection conductor made of a plate material via a shield, and a movable side conductor led out from a movable side contact is connected to a conductor of other bushing by a movable side connection conductor made of a flexible conductor via a shield (see Patent Document 2).

PRIOR ART DOCUMENT

Patent Document

[Patent Document 1] Japanese Unexamined Patent Publication No. 2007-306701 (Pages 4 to 5, FIG. 2)

[Patent Document 2] Japanese Unexamined Patent Publication No. 2010-178526 (Page 5, FIG. 2)

SUMMARY OF THE INVENTION

Problems to be Solved by the Invention

In the tank type vacuum circuit breaker disclosed in Patent Document 1, the structure is made such that each of the movable side and the fixed side contact cases on the vacuum interrupter side, which is to be connected to the conductor of each of the bushings, is an insertion type in which the conductor is directly inserted; and accordingly, mechanical vibration and impulse force due to opening and closing operation of the vacuum interrupter are directly transferred to the conductor and a porcelain tube. For this reason, there is concern that abrasion of an insertion type contact portion and slack of a fastening portion of a mechanically connected component such as the conductor and the porcelain tube are generated by the mechanical vibration and impulse force due to opening and closing operation. Furthermore, position adjustment of a fitting portion needs to be accurately performed and assembly adjustment and manufacturing of components become troublesome, which results in high cost.

On the other hand, in the tank type vacuum circuit breaker disclosed in Patent Document 2, connection portions are connected by a flexible connection conductor; and thus, mechanical vibration and impulse force due to opening and closing operation are not directly transferred to the bushing side. However, the connection conductor portion is a portion where an electric field is concentrated; and therefore, the whole is covered by a shield for electric field relaxation and the vacuum interrupter side and the bushing side are connected via this shield. More specifically, the whole of the connection portions is covered by one shield; and accordingly, a problem exists in that an outer diameter of the shield becomes large and assembly and dimension adjustment of the connection portions become troublesome.

The present invention has been made to solve the problem described above, and an object of the present invention is to obtain a tank type vacuum circuit breaker equipped with a shield, which suppresses mechanical vibration and impulse force due to opening and closing operation from being transferred to the bushing side and is easy in assembly and adjustment.

Means for Solving the Problems

According to the present invention, there is provided a tank type vacuum circuit breaker including: a cylindrical main tank which is filled with insulating gas; a vacuum interrupter which is arranged by being supported in an insulated manner in the main tank; a pair of bushings which are arranged in a standing condition on the main tank; movable side and fixed side connection terminals which are connected to contacts of the vacuum interrupter and are arranged on axial both sides of the vacuum interrupter; a flexible conductor which connects the lower end of a conductor of each of the bushings to each of the connection terminals; and a shield which surrounds connection portions of the flexible conductor. In the tank type vacuum circuit breaker, the shield is configured by combining: a main body side shield which is substantially coaxially provided with the vacuum interrupter on the axial both sides of the vacuum interrupter and covers a connection portion of the connection terminal and the flexible conductor; and a bushing side shield which is substantially coaxially provided with the conductor on the lower end side of the conductor and covers a connection portion of the conductor and the flexible conductor.

Advantageous Effect of the Invention

According to the tank type vacuum circuit breaker of the present invention, the conductor of the bushing is connected to the connection terminal by the flexible conductor and the shield for covering the connection portions is configured by combining the main body side shield which covers the connection portion of the connection terminal and the flexible conductor and the bushing side shield which covers the connection portion of the conductor of the bushing and the flexible conductor, whereby mechanical vibration and impulse force due to opening and closing of the vacuum circuit breaker can be suppressed from being transferred to the bushing side by the connection using the flexible conductor, and adjustment work of the connection portions of each of the movable side and the fixed side connection terminals of the vacuum interrupter required for position adjustment and the conductor of each of the bushings is reduced and assembly work of the shield further becomes easy by configuring the shield to be separated to the bushing side and the vacuum interrupter side.

BRIEF DESCRIPTION OF THE DRAWINGS

FIG. 2A and FIG. 2B are relevant part sectional views of FIG. 1;

FIG. 3 is a perspective view of a shield portion of FIG. 2; and

MODE FOR CARRYING OUT THE INVENTION

Embodiment 1

Figure 1:
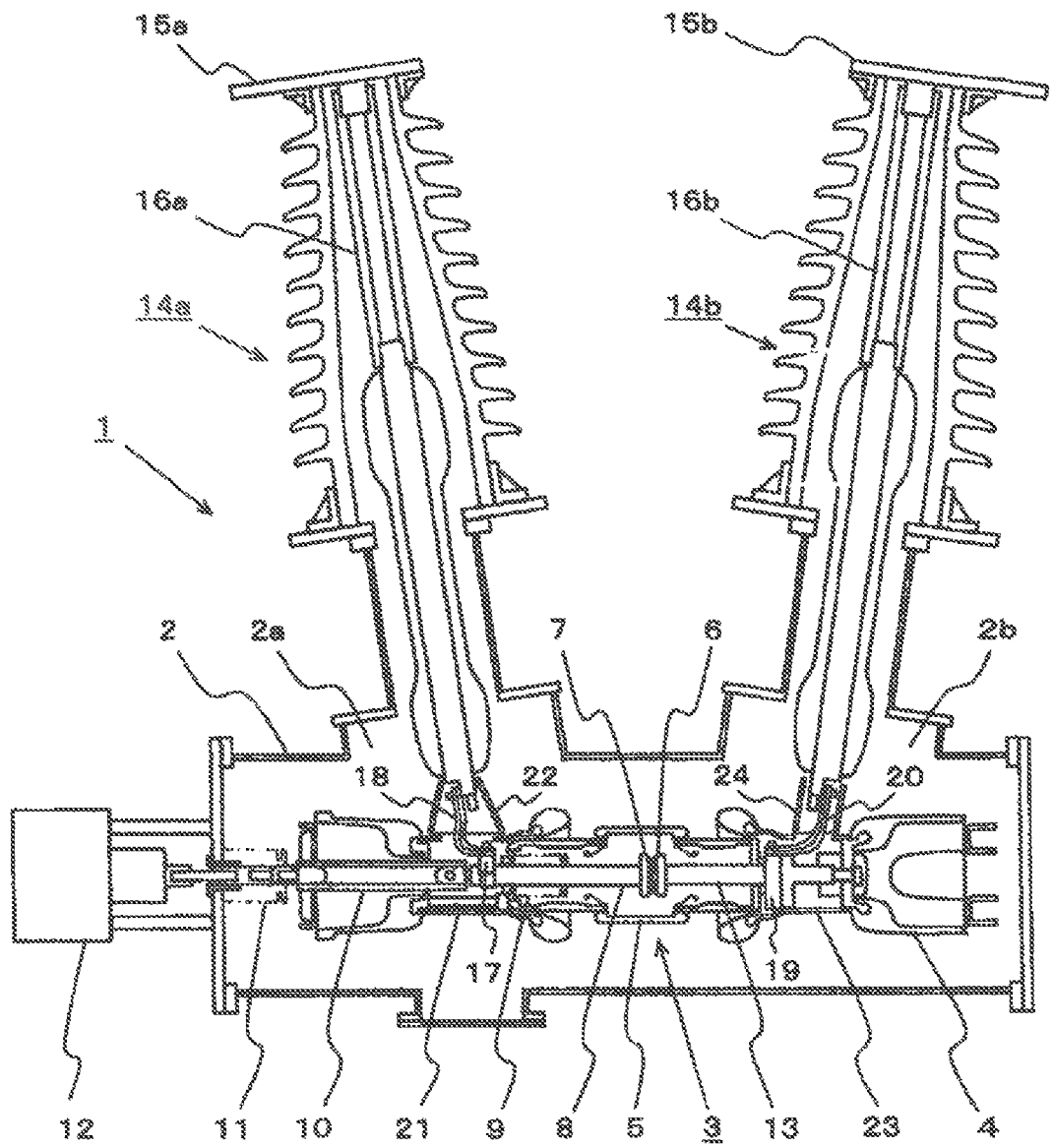
FIG. 1 is a sectional view showing a tank type vacuum circuit breaker according to Embodiment 1 of the present invention.

FIG. 1 is a sectional view showing a tank type vacuum circuit breaker according to Embodiment 1 of the present invention. Furthermore, FIG. 2A and FIG. 2B are each an enlarged sectional view of connection portions of a conductor of each of bushings and each of movable side and fixed side connection terminals connected to contacts of a vacuum interrupter in the tank type vacuum circuit breaker shown in FIG. 1; and FIG. 3 is a perspective view showing a shield portion of FIG. 2A and FIG. 2B. Hereinafter, description will be made with reference to the drawings.

First, the schematic configuration of the tank type vacuum circuit breaker 1 will be described by FIG. 1.

An electrically grounded cylindrical main tank 2 is placed with its axis line directed toward a horizontal direction and is provided with a pair of opening portions 2a and 2b on the upper side of the main tank 2. A vacuum interrupter 3 serving as a main body portion of the vacuum circuit breaker is arranged with its axis line directed in the same direction as the axis line of the main tank 2 by being supported by an insulation support member 4 in the inside of the main tank 2. The vacuum interrupter 3 is configured such that a fixed contact 6 and a movable contact 7 are arranged in face-to-face relation to be capable of being connected and/or disconnected in the inside of a tubular vacuum vessel 5 made of insulation material. Then, one end of a movable side conductor 8 connected to the movable contact 7 is led out to the outside of the vacuum vessel 5 via a bellows 9 and is further drawn to the outside of the main tank 2 via an insulation rod 10 and a bellows 11 to be connected to an operating mechanism 12. On the other hand, a fixed side conductor 13 connected to the fixed contact 6 is also led out at one end thereof to the outside of the vacuum vessel 5.

A pair of bushings 14a and 14b are arranged in a standing condition in the opening portions 2a and 2b of the main tank 2 on the upper side perpendicular to the axis line of the main tank 2 or with their upper sides inclined toward spreading at a predetermined angle. The upper end sides of the bushings 14a and 14b are airtight sealed by bushing terminals 15a and 15b. Then, conductors 16a and 16b connected to the bushing terminals 15a and 15b are arranged in the inside of the bushings 14a and 14b.

The conductor 16a is electrically connected to the movable side conductor 8 of the vacuum interrupter 3 and the conductor 16b is electrically connected to the fixed side conductor 13; and, the detail of their connection portions will be described later.

The inside of the vacuum vessel 5 is airtight held under vacuum; and a space on the outside side of the vacuum vessel 5 of the main tank 2 and inner spaces of the respective bushings 14a and 14b are filled with insulating gas adjusted to a predetermined pressure.

The movable contact 7 is made to move in the axial direction of the main tank 2 via the insulation rod 10 and the movable side conductor 8 by operating the operating mechanism. 12; and thus, both contacts 6 and 7 of the vacuum interrupter 3 are connected and/or disconnected so as to be able to close or interrupt the vacuum circuit breaker.

Next, the connection portions of each of the movable side and the fixed side of the vacuum interrupter 3 and each of the lower end sides of the conductors 16a and 16b of the bushings 14a and 14b will be described. The movable side is basically the same as the fixed side; and therefore, hereinafter, a description will be mainly made, centering on the movable side.

FIG. 2A and FIG. 2B are each a partial sectional view showing the connection portions of the lower end side of the conductor 16a of the bushing 14a on the movable side and the movable side conductor 8 side of the vacuum interrupter 3 of FIG. 1; FIG. 2A is a view seen in the same direction as FIG. 1; and FIG. 2 is a view seen in the direction shown by arrows b-b of FIG. 2A. In this regard, however, the flexible conductor is not shown in FIG. 2B.

In FIG. 2A and FIG. 2B, a movable side connection terminal 17 is provided on the movable side conductor 8 led out from the vacuum vessel 5 of the vacuum interrupter 3. The side of the movable side connection terminal 17, the side being faced to the lower side of the bushing, is formed with a connection surface so as to be in parallel to the axis line of the main tank 2 and to face the conductor 16a. On the other hand, a half of the conductor diameter of the lower end side of the conductor 16a of the bushing is cut out to form a connection surface so as to be in parallel to the axis line of the conductor 16a and to face the axial direction of the main tank 2. Both ends of a movable side flexible conductor 18 are connected to both of the connection surfaces.

The movable side flexible conductor 18 is formed by overlapping a plurality of sheets of belt-shaped thin sheets made of material excellent in conductivity, for example, copper or aluminum material; both end portion sides are integrally fixed and are formed with connecting holes so as to be connected to each of the connection surfaces by bolt clamping.

Incidentally, the fixed side is substantially the same; and as shown in FIG. 1, a connection surface formed on a fixed side connection terminal 19 connected to the fixed side conductor 13 on the outside side of the vacuum vessel 5 and a connection surface formed on the lower end of the conductor 16b of the bushing 14b are connected by a fixed side flexible conductor 20.

Next, a shield for relaxing the concentration of an electric field of the connection portions, which is a characterizing portion of the present application, will be described. The shield is divided into two parts: one is a main body side shield which is substantially coaxially provided with the vacuum interrupter on the axial both sides of the vacuum interrupter and covers the connection portion of the flexible conductor and the connection terminal; and the other is a bushing side shield which is substantially coaxially provided with the conductor on the lower end side of the conductor and covers the connection portion of the conductor and the flexible conductor. The shield is configured by combining both of the main body side shield and the bushing side shield.

If the description will be made by the movable side shown in FIG. 2A, the configuration is made such that a cylindrical main body side shield 21 mainly covers the connection portion of the movable side connection terminal 17 and the movable side flexible conductor 18; and a bushing side shield 22 mainly covers the connection portion of the lower end side of the conductor 16*a* and the movable side flexible conductor 18.

The fixed side is substantially similar and is provided with a main body side shield 23 and a bushing side shield 24 (see FIG. 1).

As shown in FIG. 2B, an adapter 25 is provided on the lower end of the conductor 16*a* in order to attach the bushing side shield 22 on the lower portion side of the conductor 16*a*. The adapter 25 has an attachment surface on the side portion thereof, the attachment surface being to be fitted to the inner diameter of the bushing side shield 22. The adapter 25 is fixed to the lower end surface of the conductor 16*a* by fixing bolts 26. The inner circumference side of the bushing side shield 22 is made to fit to the attachment surface on the side of the adapter 25 and is fixed by screw clamp or the like.

On the other hand, the main body side shield 21 is fixed on either both sides one side of the axial end portions to a member of the main body portion side of the vacuum circuit breaker by screw clamp or the like.

Incidentally, dimensions are set so that a slight gap is formed at a joint portion between both of the shields 21 and 22 in a state where both of the shields 21 and 22 are attached.

Next, the shape of the shield will be described in detail.

FIG. 3 is a perspective view of the movable side shield described in FIG. 2A and FIG. 2B. The shield is formed by a thin sheet of a conductive material made of, for example, aluminum, copper, or their alloy; and the cylindrical main body side shield 21 is divided into two parts along the axial direction of the main tank 2 in order to facilitate assembly and processing. The drawing shows a case where the shield is divided above and below into two parts. By dividing into two parts, manufacturing can be easily made by bending from a flat plate. Fixing holes 21*a* are formed in the vicinity of axial end portions. Furthermore, an opening holes 21*b* of substantially the same size as that of the lower end side of the bushing side shield 22 is formed on the side facing the bushing side shield 22.

On the other hand, the bushing side shield 22 is a cylindrical shape spread toward the bottom; and in order to facilitate assembly and process the bushing side shield 22 is also divided into two parts along the axial direction of the conductor 16*a*. Fixing holes 22*a* for attaching to the adapter 25 are provided on the side.

The reason why the lower side of the bushing side shield 22 is spread toward the bottom is that the movable side flexible conductor 18 moves at the connection portion with the movable side connection terminal 17 in the axial direction in conjunction with the operation in which the movable contact 7 is connected and/or disconnected to/from the fixed contact 6 and therefore its movement is taken into account. In this regard, however, even when the movable contact 7 moves, a straight cylindrical shape may be permissible if necessary distance can be secured.

Furthermore, the shape of the main body side shield 23 and the bushing side shield 24 on the fixed side may be basically similar to that of the movable side; however, there is no movement of the fixed side flexible conductor 20 on the fixed side. Therefore, if the bushing side shield 24 is a straight cylindrical shape as shown in FIG. 1, manufacturing is easy.

The action of the thus configured connection portion will be described.

First, the lower end side of the conductor of the bushing and the connection terminal of the conductor side led out from the vacuum interrupter are connected by the flexible conductor; and thus, propagation of mechanical vibration and impulse force due to opening and closing of the circuit, breaker to a porcelain tube and the conductor of the bushing can be reduced.

Furthermore, adjustment work of the conductor that intersects with the axis of the vacuum interrupter is reduced in the movable side and the fixed side of the vacuum interrupter, both of the movable side and the fixed side being required for position adjustment with a main tank axis. Further, flexibility of a connection position with the conductor increases and it also becomes possible to connect at a position other than an axis intersecting position.

In order to utilize the merits of using the aforementioned flexible conductor, the shield is divided into the bushing side shield and the main body side shield to block the mechanical vibration and impulse force from being transferred via the shield.

Furthermore, the shield is divided into the bushing side and the main body side and thus the whole can be compact; and the connection surface is further formed in the direction as described above and thus, more particularly, the radial dimension of the bushing side shield can be reduced. The shield can be compact; and therefore, as a result, it becomes possible to achieve minimization of the tank.

Figure 4:
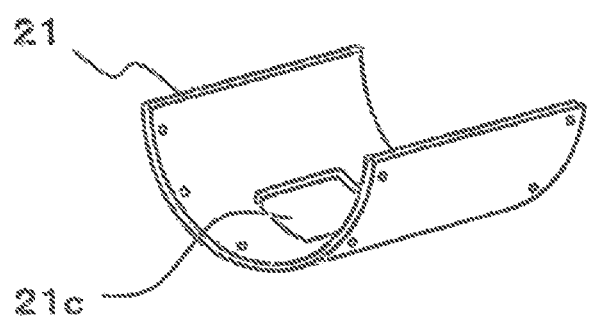
FIG. 4 is a perspective view showing other example of the shield of the tank type vacuum circuit breaker according to Embodiment 1 of the present invention.

FIG. 4 is a partial perspective view showing other example of the shield and the view corresponding to a lower portion of the main body side shield divided into two parts in FIG. 3. FIG. 4 is equivalent to FIG. 3 except for those shown in the drawing.

As shown in the drawing, the lower portion side of the main body side shield 21 divided into two parts is formed with an opening hole 21*c* for inspection or for work near a central portion. Incidentally, the position of the opening hole 21*c* is located on a surface opposite to the side to be combined with the bushing side shield.

According to this configuration, the lower portion side of the main tank is generally provided with a manhole as shown in FIG. 1; and therefore, inspection of the connection portion and, for example, work of assembly and removal of a connecting pin of an insulation rod can be performed in a state where the shields are attached.

As described above, according to the tank type vacuum circuit breaker of Embodiment 1, the tank type vacuum circuit breaker includes: the cylindrical main tank which is filled with insulating gas; the vacuum interrupter which is arranged by being supported in an insulated manner in the main tank; a pair of bushings which are arranged in a standing condition on the main tank; the movable side and fixed side connection terminals which are connected to the contacts of the vacuum interrupter and are arranged on axial both sides of the vacuum interrupter; the flexible conductor which connects the lower end of the conductor of each of the bushings to each of the connection terminals; and the shield which surrounds the connection portions of the flexible conductor. In the tank type vacuum circuit breaker, the shield is configured by combining: the main body side shield which is substantially coaxially provided with the vacuum interrupter on the axial both sides of the vacuum interrupter and covers the connection portion of the flexible conductor and the connection terminal; and the bushing side shield which is substantially coaxially provided with the conductor on the lower end side of the conductor and covers the connection portion of the conductor and the flexible conductor. Therefore, mechanical vibration and impulse force due to opening and closing of the vacuum circuit breaker can be suppressed from being transferred to the bushing side by the connection using the flexible conductor; and, by configuring the shield to be separated to the bushing side and the vacuum interrupter side, adjustment work of the connection portions of each of the connection terminals of the movable side and the fixed side of the vacuum interrupter, both of the movable side and the fixed side being required for the position adjustment, and the conductor of each of the bushings is reduced and assembly work of the shield further becomes easy.

Furthermore, the connection surface on the lower end side of the conductor, the connection surface being to be connected to the flexible conductor, is formed in parallel to the axis line of the conductor and facing the axial direction of the main tank; and the connection surface on the connection terminal side is formed in parallel to the axis line of the main tank and facing the conductor. Therefore, the radial dimension of the bushing side shield can be reduced and the whole of the shield can be reduced in size.

Moreover, the main body side shield is divided into two parts along the axial direction of the main tank; and the bushing side shield is divided into two parts along the axial direction of the conductor. Therefore, manufacturing and assembly of the shield are facilitated.

Further, the main body side shield is formed with the opening hole for inspection or work on the surface opposite to the side to be combined with the bushing side shield. Therefore, inspection of the connection portions and work such as connection and removal of components in the shields can be facilitated.

EXPLANATIONS OF LETTERS OR NUMERALS

1: Tank type vacuum circuit breaker
2: Main tank
2a, 2b: Opening portion
3: Vacuum interrupter
4: Insulation support member
5: Vacuum vessel
6: Fixed contact
7: Movable contact
8: Movable side conductor
9, 11: Bellows
10: Insulation rod
22: Operating mechanism
13: Fixed side conductor
14a, 14b: Bushing
15a, 15b: Bushing terminal
16a, 16b: Conductor
17: Movable side connection terminal
18: Movable side flexible conductor
19: Fixed, side connection terminal
20: Fixed side flexible conductor
21, 23: Main body side shield
21a, 22a: Fixing hole
21b, 21c: Opening hole
22, 24: Bushing side shield
25: Adapter
26: Fixing bolt.

The invention claimed is:
1. A tank type vacuum circuit breaker comprising:
a cylindrical main tank which is filled with insulating gas;
a vacuum interrupter which is arranged by being supported in an insulated manner in said main tank;
a pair of bushings which are arranged in a standing condition on said main tank;
movable side and fixed side connection terminals which are connected to contacts of said vacuum interrupter and are arranged on both axial sides of said vacuum interrupter;
a flexible conductor which connects the lower end of a conductor of each of said bushings to each of said connection terminals; and
a shield which surrounds connection portions of said flexible conductor,
wherein said shield is configured by combining:
a main body side shield which is substantially coaxially provided with said vacuum interrupter on the axial sides of said vacuum interrupter and covers a connection portion of said flexible conductor and said connection terminal; and
a bushing side shield which is substantially coaxially provided with said conductor on the lower end side of said conductor and covers a connection portion of said conductor and said flexible conductor.

2. The tank type vacuum circuit breaker according to claim 1,
wherein a connection surface on the lower end side of said conductor, the connection surface being to be connected to said flexible conductor, is formed in parallel to an axis line of said conductor and facing the axial direction of said main tank; and
a connection surface on said connection terminal side is formed in parallel to an axis line of said main tank and facing said conductor.

3. The tank type vacuum circuit breaker according to claim 2,
wherein said main body side shield is divided into two parts along the axial direction of said main tank; and
said bushing side shield is divided into two parts along the axial direction of said conductor.

4. The tank type vacuum circuit breaker according to claim 2,
wherein said main body side shield is formed with an opening hole for inspection or work on a surface opposite to the side to be combined with said bushing side shield.

5. The tank type vacuum circuit breaker according to claim 1,
wherein said main body side shield is divided into two parts along the axial direction of said main tank; and
said bushing side shield is divided into two parts along the axial direction of said conductor.

6. The tank type vacuum circuit breaker according to claim 5,
wherein said main body side shield is formed with an opening hole for inspection or work on a surface opposite to the side to be combined with said bushing side shield.

7. The tank type vacuum circuit breaker according to claim 1,
wherein said main body side shield is formed with an opening hole for inspection or work on a surface opposite to the side to be combined with said bushing side shield.

8. The tank type vacuum circuit breaker according to claim 1, wherein the vacuum interrupter is arranged to extend in the axial direction of the main tank.

9. The tank type vacuum circuit breaker according to claim 1, wherein the contact connected to the movable side connection terminal is arranged to move in the axial direction of the main tank.

10. The tank type vacuum circuit breaker according to claim 1, wherein the connection portion of the flexible conductor and the connection terminal is surrounded by walls of the main body side shield.

11. The tank type vacuum circuit breaker according to claim 1, wherein the connection portion of the conductor and the flexible conductor is surrounded by walls of the bushing side shield.

12. The tank type vacuum circuit breaker according to claim 1, wherein the main body side shield is cylindrically shaped.

13. The tank type vacuum circuit breaker according to claim 1, wherein the bushing side shield is cylindrically shaped or frustaconically shaped.

14. The tank type vacuum circuit breaker according to claim 1, wherein the bushing side shield is disposed above the main body side shield and includes an opening above the main body side shield.

15. The tank type vacuum circuit breaker according to claim 1, wherein the flexible conductor extends along an axial direction of the bushing side shield toward the conductor.

16. The tank type vacuum circuit breaker according to claim 1, wherein the flexible conductor is L-shaped inside the main body side shield and the bushing side shield.

* * * * *